United States Patent
Persson et al.

(10) Patent No.: US 11,606,701 B2
(45) Date of Patent: Mar. 14, 2023

(54) ENHANCED ESTABLISHMENT OF COMMUNICATION BETWEEN NODES IN A COMMUNICATION SYSTEM

(71) Applicant: Telefonaktiebolaget LM Ericsson (publ), Stockholm (SE)

(72) Inventors: Lars Persson, Åsa (SE); Christer Engdahl, Särö (SE); Ola Kaspersson, Varberg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 71 days.

(21) Appl. No.: 16/955,833

(22) PCT Filed: Dec. 19, 2017

(86) PCT No.: PCT/EP2017/083645
§ 371 (c)(1),
(2) Date: Jun. 19, 2020

(87) PCT Pub. No.: WO2019/120492
PCT Pub. Date: Jun. 27, 2019

(65) Prior Publication Data
US 2021/0014700 A1 Jan. 14, 2021

(51) Int. Cl.
*H04W 16/28* (2009.01)
*H04B 7/06* (2006.01)
(Continued)

(52) U.S. Cl.
CPC .......... *H04W 16/28* (2013.01); *H04B 7/0695* (2013.01); *H04B 7/088* (2013.01); *H04L 5/0048* (2013.01)

(58) Field of Classification Search
CPC ..... H04B 7/0695; H04B 7/088; H04L 5/0048; H04W 16/28; H04W 64/006; H04W 72/048
See application file for complete search history.

(56) References Cited

U.S. PATENT DOCUMENTS

2012/0008490 A1* 1/2012 Zhu ...................... H04B 7/0452
370/216
2015/0045048 A1* 2/2015 Xu ..................... H04W 72/0413
455/452.1
(Continued)

FOREIGN PATENT DOCUMENTS

EP 2897304 A1 * 7/2015 ........... H04B 7/0695
EP 2897304 A1 7/2015
(Continued)

OTHER PUBLICATIONS

International Search Report and the Written Opinion of the International Searching Authority, issued in corresponding International Application No. PCT/EP2017/083645, dated Sep. 4, 2018, 14 pages.

*Primary Examiner* — Ian N Moore
*Assistant Examiner* — Sun Jong Kim
(74) *Attorney, Agent, or Firm* — Rothwell, Figg, Ernst & Manbeck, P.C.

(57) ABSTRACT

A wireless communication system comprising a first network node and a wireless device is provided. The system is adapted to establish communication between the first network node and the wireless device. The device is adapted to obtain information related to a geographic location of the device, to transmit the information related to the geographic location to the network node, and to transmit a Sounding Reference Signal to the node. The node is adapted to receive information related to a geographic location of the device, and to determine an antenna configuration of the network node for communicating with the device via a directive antenna, based on the geographic location of the device. A network node is adapted to communicate with the device by the first network node, via the directive antenna, by means of the determined antenna configuration.

22 Claims, 10 Drawing Sheets

(51) Int. Cl.
    *H04B 7/08*     (2006.01)
    *H04L 5/00*     (2006.01)

(56) References Cited

U.S. PATENT DOCUMENTS

| 2015/0296522 | A1* | 10/2015 | Bergstrom | H04B 7/0456 |
| | | | | 370/329 |
| 2017/0099092 | A1* | 4/2017 | Kakishima | H04B 7/0469 |
| 2017/0202029 | A1* | 7/2017 | Qi | H04W 72/085 |
| 2018/0138590 | A1* | 5/2018 | Uchida | H04B 7/0619 |
| 2020/0059290 | A1* | 2/2020 | Pan | H04B 17/327 |

FOREIGN PATENT DOCUMENTS

| WO | 2017118479 A1 | 7/2017 | | |
| WO | WO-2017118479 A1 * | 7/2017 | | H04B 7/0617 |
| WO | 2017196247 A1 | 11/2017 | | |

* cited by examiner

Xn1
Request transmission of wireless device geographic location

Xn2
obtain information related to geographic location of wireless device

Xn21
receive the information related to geographic location using wide beam configuration

Xn22
receive the information related to geographic location via a second network node

Xn23
obtain information related to geographic location relative to first network node

Xn3
determine directive antenna configuration based on the geographic location

Xn31
determine directive beam configuration with beam width below 20 degrees

Xn32
determine directive beam comprising a plurality of antenna lobes

Xn4
communicate with the wireless device using the determined antenna configuration.

Xn41
requesting SRS transmission from wireless device to first network node, wherein the SRS

Xn42
Receive SRS via directive antenna configured with narrow beam width

Xn5
transmit geographic location to third network node involved in handover procedure

FIG. 12

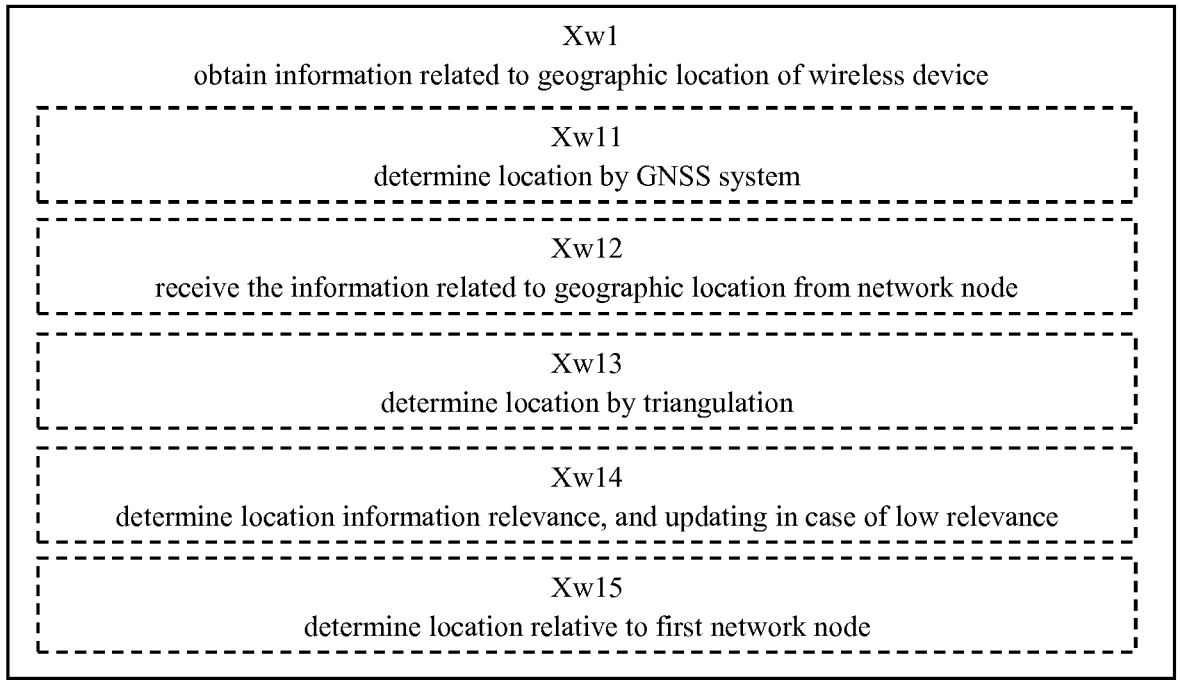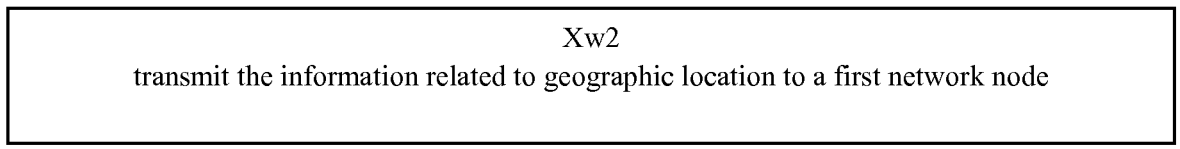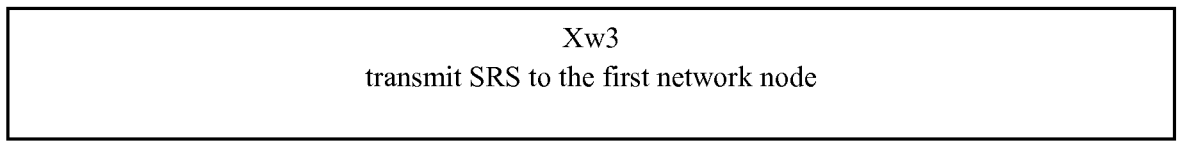
FIG. 13

ENHANCED ESTABLISHMENT OF COMMUNICATION BETWEEN NODES IN A COMMUNICATION SYSTEM

CROSS REFERENCE TO RELATED APPLICATION(S)

This application is a 35 U.S.C. § 371 National Phase Entry Application from PCT/EP2017/083645, filed Dec. 19, 2017, designating the United States, the disclosure of which is incorporated herein by reference in its entirety.

TECHNICAL FIELD

The present disclosure relates to a communication system comprising a first network node and a wireless device, where the communication system is adapted to establish communication between the first network node and the wireless device, where the first network node comprises a directive antenna.

BACKGROUND

Active Antenna Systems (AAS) is an important part of LTE (Long Term Evolution) and an essential part of 5G. AAS is a generic term that is often used to describe base stations that incorporate a large number of separate transmitters and antenna elements that can be used for MIMO (Multiple Input Multiple Output) and beamforming as an integrated product. This will be one of the key aspects of 5G as the industry moves higher up in frequency and more complex array antenna geometries are needed to achieve the desired link budget.

At higher frequencies, propagation losses are higher than in currently used frequency bands. Furthermore, it is envisaged that base station transmissions will take place within higher bands in the microwave and millimeter-wave region. Since the transmit power of both base stations and user equipment is limited by physical constraints and considerations such as Electro-Magnetic Fields (EMF) for base stations and Specific Absorption Rate (SAR) for user equipment, it is not possible to compensate the increased penetration losses and provide sufficient Signal-to-Interference+Noise Ratio (SINR) within wider bandwidths simply with increased transmit power.

In order to achieve the link budgets required for high data rates, beamforming will be necessary. Integrated active arrays therefore constitute a mainstream type of base station within 5G. In such AAS products it will be essential to use the beam forming capability as efficiently as possible.

Beamforming is in this context used to configure the base station's antennas towards a specific UE in a narrow beam for reception and transmission, i.e. a beam with high antenna gain. To do this, it is necessary to obtain channel state information (CSI), comprising information about where the UE is located and the nature of the communication channel between the UE and the base station, i.e. the electromagnetic properties of the intermediate environment.

To obtain this, the UE sends a Sounding Reference Signal (SRS) which is used by the base station to extract the CSI. In situations where the location of the UE is not known in advance by the base station, the base station normally uses a broad beam to receive the SRS. This can result in poor quality of the CSI due to low gain of the broad beam and limited output power of the UE.

Since the performance of the subsequent beamforming toward the UE relies on accurate CSI, this performance can be poor, e.g. the narrow beams may not point in the correct directions and may be poorly adapted to the environment. This can severely degrade the overall network performance, even though the situation for high network performance would have been favorable if only accurate CSI would have been available.

It is therefore a desire to provide a wireless communication system where power is saved, link budget improved and the time needed for a user terminal to connect to the base station is decreased.

SUMMARY

It is an object of the present disclosure to provide a wireless communication system where power is saved, link budget improved and the time needed for a user terminal to connect to the base station is decreased.

Said object is obtained by means of a network node adapted to establish communication between a first network node and a wireless device in a wireless communication system, where the first network node comprises a directive antenna. The network node is adapted to obtain information related to a geographic location of the wireless device and to determine an antenna configuration of the first network node for communicating with the wireless device via the directive antenna, based on the geographic location of the wireless device. The network node is adapted to communicate with the wireless device by the first network node, via the directive antenna, by means of the determined antenna configuration.

This provides an advantage of improving link budget, reducing base station processor work load thereby saving power, and decreasing time for connection.

According to some aspects, the network node is adapted to request the wireless device to transmit the information related to geographic location to the first network node.

According to some aspects, the network node is adapted to receive the information related to said geographic location via a directive beam of the directive antenna, wherein the directive beam is arranged to have a beamwidth in excess of 20 degrees.

This provides an advantage of securely obtaining information related to said geographic location in a reliable manner without having any prior information regarding the position of the wireless device.

According to some aspects, the network node is adapted to receive the information related to geographic location via a second network node.

This provides an advantage of securing that the information related to geographic location reaches the network node.

According to some aspects, the network node is adapted to obtain information related to a geographic location relative to the first network node.

According to some aspects, the network node is adapted to determine a directive beam configuration of the directive antenna arranged to have a beamwidth below 20 degrees.

According to some aspects, the network node is adapted to determine a directive beam configuration of the directive antenna, wherein the directive beam comprises a plurality of antenna lobes.

This provides an advantage of only needing a reduced number of narrow high gain beams pointing in the direction of where the wireless device is known to be located, instead of listening in the total served cell.

According to some aspects, the network node is adapted to request the wireless device to transmit a Sounding Reference Signal, SRS, to the first network node.

According to some aspects, the network node is adapted to receive the SRS via a directive beam of the directive antenna configured to have a beamwidth below 20 degrees.

This provides an advantage of only needing a reduced number of narrow high gain beams receiving for the SRS in the direction of where the wireless device is known to be located, instead of receiving in the total served cell.

According to some aspects, the network node is adapted to transmit the information related to geographic location to a third network node involved in a handover procedure comprising the wireless device.

This provides an advantage of the third network node only needing a reduced number of narrow high gain beams receiving for the SRS in the direction of where the wireless device is known to be located, instead of receiving in the total served cell.

According to some aspects, the first network node is a radio base station.

According to some aspects, the network node that is adapted to establish communication between the first network node and the wireless device is the first network node.

This provides an advantage of having a local implementation which is advantageous for certain scenarios.

According to some aspects, the network node that is adapted to establish communication between the first network node and the wireless device is a processing node, different from the first network node, comprised in the wireless communication system.

This provides an advantage of having a central implementation which is advantageous for certain scenarios.

Said object is also obtained by means of a wireless device adapted to establish communication between a first network node and the wireless device in a wireless communication system. The wireless device is adapted to obtain information related to a geographic location of the wireless device, to transmit the information related to the geographic location to the first network node, and to transmit a Sounding Reference Signal, SRS, to the first network node.

This provides an advantage of improving link budget, reducing base station processor work load thereby saving power, and decreasing time for connection.

According to some aspects, the wireless device is adapted to determine the geographic location by a Global Navigation Satellite System, GNSS.

This provides an advantage of obtaining an accurate positioning using an existing system.

According to some aspects, the wireless device is adapted to receive geographic location information related to the wireless device from a network node comprised in the wireless communication system.

According to some aspects, the wireless device is adapted to determining the geographic location by triangulation in the wireless communication system.

This provides an advantage of obtaining an accurate positioning using resources in the wireless communication system.

According to some aspects, the wireless device is adapted to determine a relevance of a previously stored geographic location, and updating the geographic location in case the determined relevance does not satisfy a relevance criterion.

According to some aspects, the wireless device is adapted to determining a geographic location relative to the first network node.

Said object is also obtained by means of a wireless communication system comprising a first network node and a wireless device, where the wireless communication system is adapted to establish communication between the first network node and the wireless device, where the first network node comprises a directive antenna. The wireless device is adapted to obtain information related to a geographic location of the wireless device, to transmit the information related to the geographic location to the first network node, and to transmit a Sounding Reference Signal, SRS, to the first network node. The network node is adapted to receive information related to a geographic location of the wireless device and to determine an antenna configuration of the first network node for communicating with the wireless device via the directive antenna, based on the geographic location of the wireless device. The network node is further adapted to communicate with the wireless device by the first network node, via the directive antenna, by means of the determined antenna configuration.

This provides an advantage of improving link budget, reducing base station processor work load thereby saving power, and decreasing time for connection.

Said object is also obtained by means of a method for establishing communication between a first network node and a wireless device in a wireless communication system, performed by a network node. The method comprises obtaining information related to a geographic location of the wireless device, determining an antenna configuration of the first network node for communicating with the wireless device via a directive antenna, based on the geographic location of the wireless device. the method further comprises communicating with the wireless device by the first network node, via the directive antenna, using the determined antenna configuration.

This provides an advantage of improving link budget, reducing base station processor work load thereby saving power, and decreasing time for connection.

Said object is also obtained by means of a method for establishing communication between a first network node and a wireless device in a wireless communication system, performed by the wireless device, the method comprising obtaining information related to a geographic location of the wireless device, transmitting the information related to the geographic location to the first network node, and transmitting a Sounding Reference Signal, SRS, to the first network node.

This provides an advantage of improving link budget, reducing base station processor work load thereby saving power, and decreasing time for connection.

BRIEF DESCRIPTION OF THE DRAWINGS

The present disclosure will now be described more in detail with reference to the appended drawings, where:

FIG. 12 shows a wireless communication system according to some aspects of the present disclosure; and FIG. 13 shows a wireless communication system according to some further aspects of the present disclosure.

DETAILED DESCRIPTION

Figure 1:
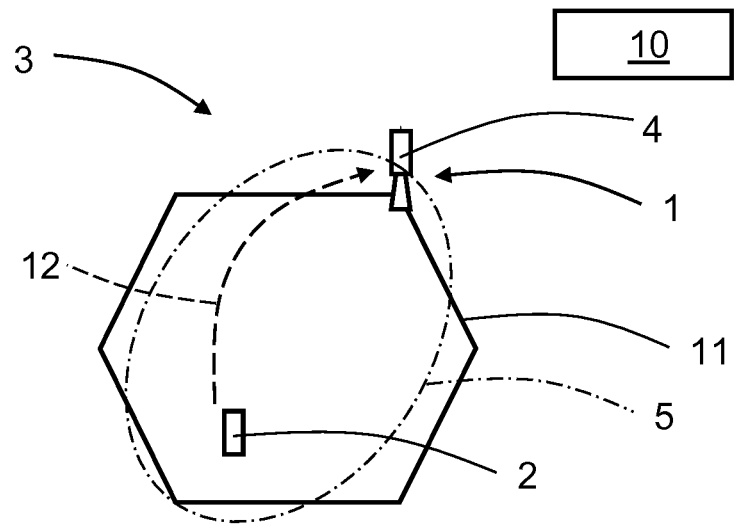
FIG. 1 shows a schematical view of a first operation in a first example of a wireless communication system.

With reference to FIG. 1, there is a first example of a wireless communication system 3 comprising a first network node 1 and a wireless device 2, in this example the first network node 1 is a first radio base station 1 and the wireless device 2 is any suitable user terminal 2. The user terminal 2 is positioned in a first communication cell 11 that is covered by the first radio base station 1.

The communication system 3 is adapted to establish communication between the first radio base station 1 and the user terminal 2. The first radio base station 1 comprises a directive antenna 4 and is according to the present disclosure adapted to receive information related to a geographic location of the user terminal 2. This information can be provided to the radio base station 1 either from the user terminal 2 itself or from other base stations or nodes or a core network, e.g. obtained by triangulation or cell-based positioning.

In the former case, which is illustrated in FIG. 1 and which will be discussed in the following in the form of a first example, the user terminal 2 is adapted to obtain information related to its geographic location. For this purpose, according to some aspects, the user terminal 2 comprises a Global Navigation Satellite System (GNSS) functionality. When having obtained this information, it is transmitted from the user terminal 2 to the first radio base station 1 as illustrated with a first dashed arrow 12, according to some aspects upon a request from the first radio base station 1. The first network node, at this stage not yet having information regarding the geographic location of the user terminal 2, is receiving the transmitted information related to the geographic location via a directive beam 5 of the directive antenna 4. According some aspects, this beam 5 is relatively broad, and for example having a beamwidth in excess of 20 degrees.

Figure 2:
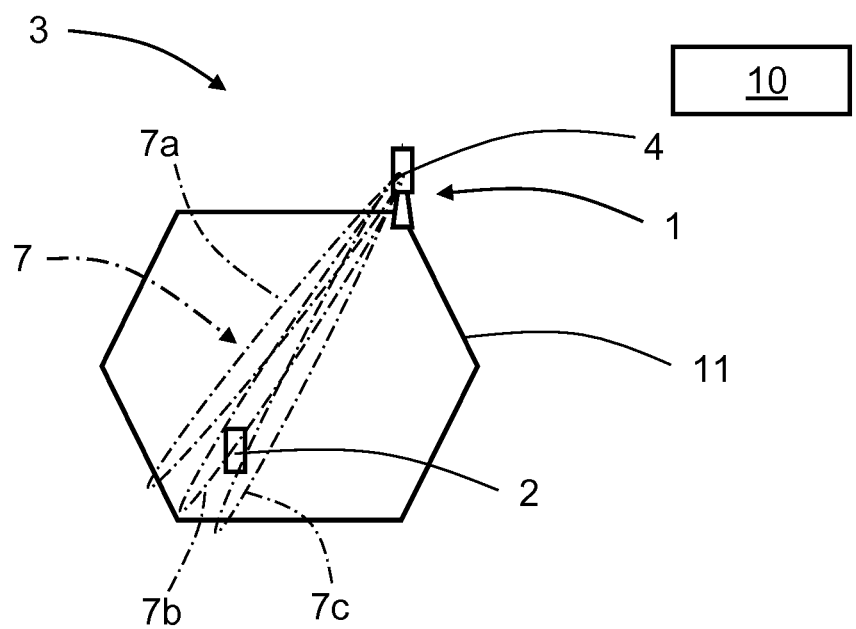
FIG. 2 shows a schematical view of a second operation in the first example of a wireless communication system.

With reference to FIG. 2, having acquired information regarding the geographic location of the user terminal 2, the first radio base station 1 is adapted to determine a directive beam configuration of the directive antenna 4, where a resulting directive beam 7 comprises a plurality of antenna lobes 7a, 7b, 7c. These antenna lobes 7a, 7b, 7c are directed towards the geographic location of the user terminal 2 as derived from the acquired information regarding the geographic location of the user terminal 2. According to some aspects, these antenna lobes 7a, 7b, 7c are relatively narrow, having a beamwidth below 20 degrees.

The user terminal 2 transmits a Sounding Reference Signal (SRS) to the first network node, according to some aspects upon a request from the first network node 1. Reception of the SRS by the first network node 1, is performed via the directive antenna 4, by means of the determined antenna configuration, here by means of the plurality of antenna lobes 7a, 7b, 7c. and once a good CSI information has been obtained, this can be maintained by using conventional beam tracking techniques for further communication with the wireless device 2. In this example, the directive antenna 4 uses an antenna configuration that produces a relatively narrow tracking beam 19.

This enables the radio base station 1 to use relatively narrow beams in a reduced spatial search space in the reception of SRS. This is made possible by providing a priori information about the user terminal's geographic location relative the radio base station 1. The radio base station is thus enabled to receive SRS in one or a few narrow beams 7a, 7b, 7c and obtain accurate Channel State Information (CSI) estimates facilitated by the high beamforming gain, without essential drawbacks in terms of sweep search time or computational cost associated with many parallel beams.

Figure 7:
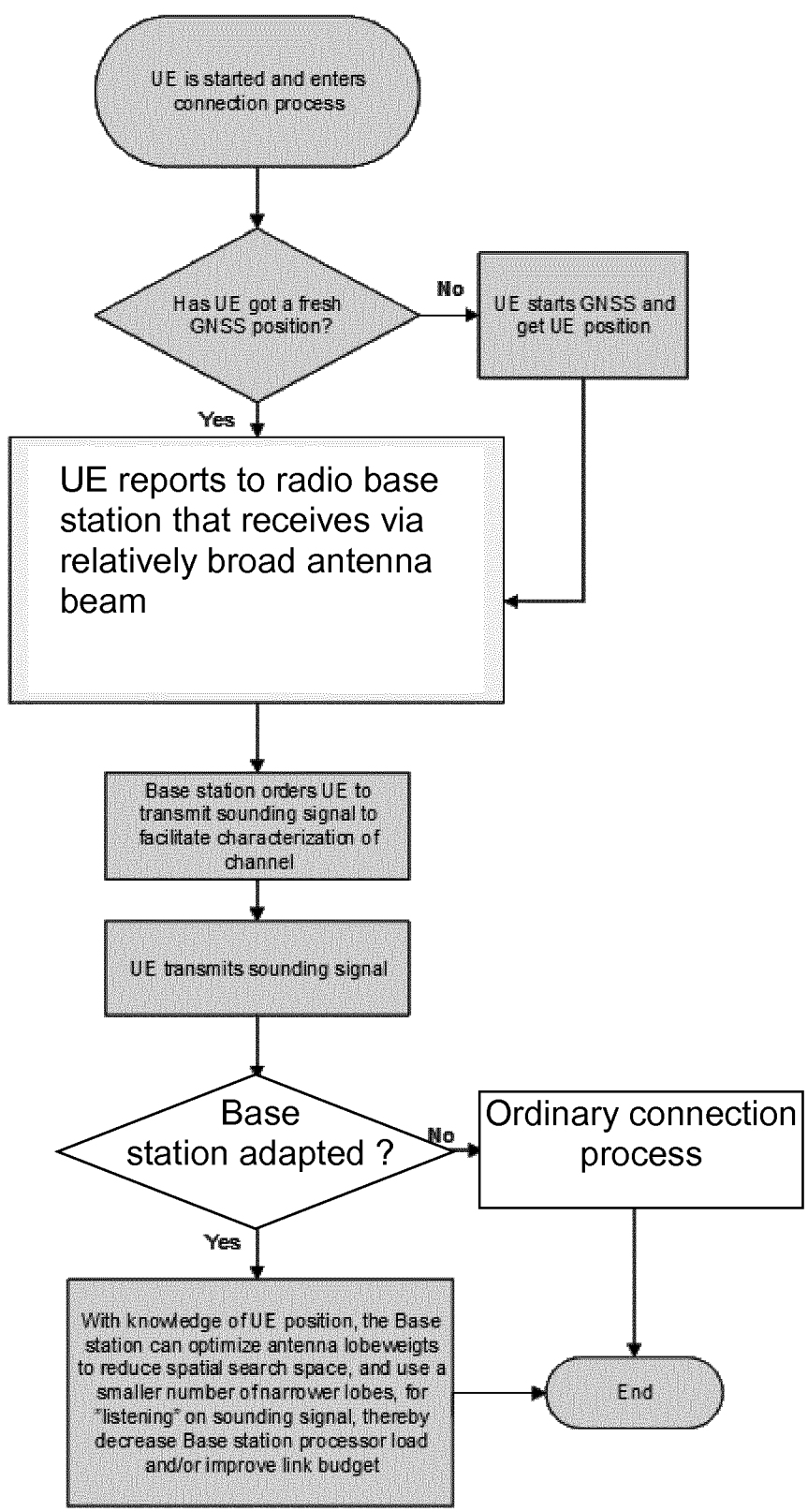
FIG. 7 shows a flowchart of the first example.

An example of the above procedure is shown in a flow chart in FIG. 7, where the user terminal 2 is exemplified as a UE (User Equipment).

First, when the process has started and the UE 2 has acquired fresh position data, i.e. information regarding the geographic location of the UE 2, the UE 2 reports this data to the radio base station 1 that receives via relatively broad antenna beam. The radio base station 1 then orders the UE 2 to transmit an SRS, which the UE 2 then does.

If the radio base station 1 is adapted for handling the position data according to the present disclosure, a number of relatively narrow antenna lobes are used for listening for the SRS, and if not, an ordinary connection process will occur instead.

Figure 3:
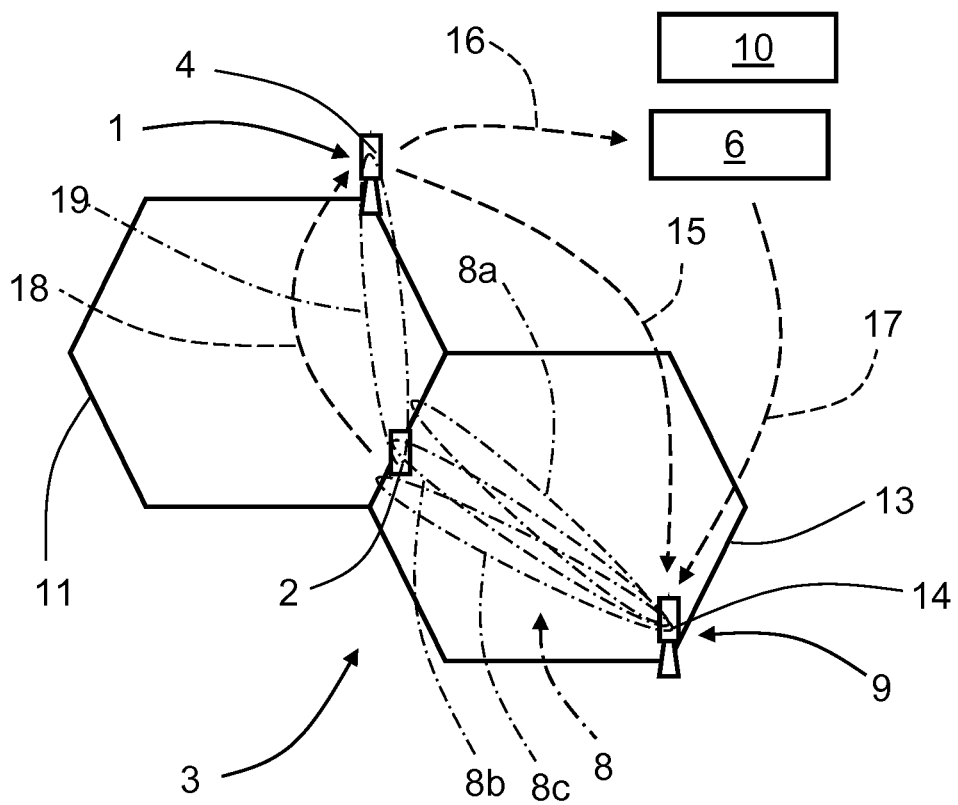
FIG. 3 shows a schematical view of a second example of a wireless communication system.

With reference to FIG. 3 that shows a second example that exemplifies handover, there is also a second network node 6 and a third network node 9. When the user terminal 2 is about to leave the first communication cell 11 and enter a second communication cell 13 that is served by the third network node that here is constituted by a third radio base station 9 that comprises a directive antenna 14, the first radio base station 1 transmits present information regarding the geographic location of the user terminal 2 to the third radio base station 9. This information is either transmitted directly as indicated with a dashed arrow 15, or via the second network node 6 as indicated with two dashed arrows 16, 17.

For this purpose, the first radio base station 1 has been keeping track of the user terminal 2, and requests an update of the information regarding the geographic location of the user terminal 2 as indicated with a dashed arrow 18. The relatively narrow tracking beam 19 is here used for receiving the information regarding the geographic location of the user terminal 2, a relatively broad beam is not necessary since the first radio base station 1 has been keeping track of the user terminal 2.

In a manner corresponding to the first example, when the user terminal is requested to transmit an SRS to the third radio base station 9, its directive antenna 14 is configured to determine a directive beam configuration where a resulting directive beam 8 comprises a plurality of antenna lobes 8a, 8b, 8c. These antenna lobes 8a, 8b, 8c are directed towards the geographic location of the user terminal 2 as derived from the acquired information regarding the geographic location of the user terminal 2. According to some aspects, these antenna lobes 8a, 8b, 8c are relatively narrow, having a beamwidth below 20 degrees.

Once a good CSI information has been obtained, this can be maintained by using conventional beam tracking techniques for further communication with the wireless device 2. In this example, the directive antenna 14 uses an antenna configuration that produces a relatively narrow tracking beam (not shown) in the same way as the first radio base station 1 in FIG. 2.

Figure 8:
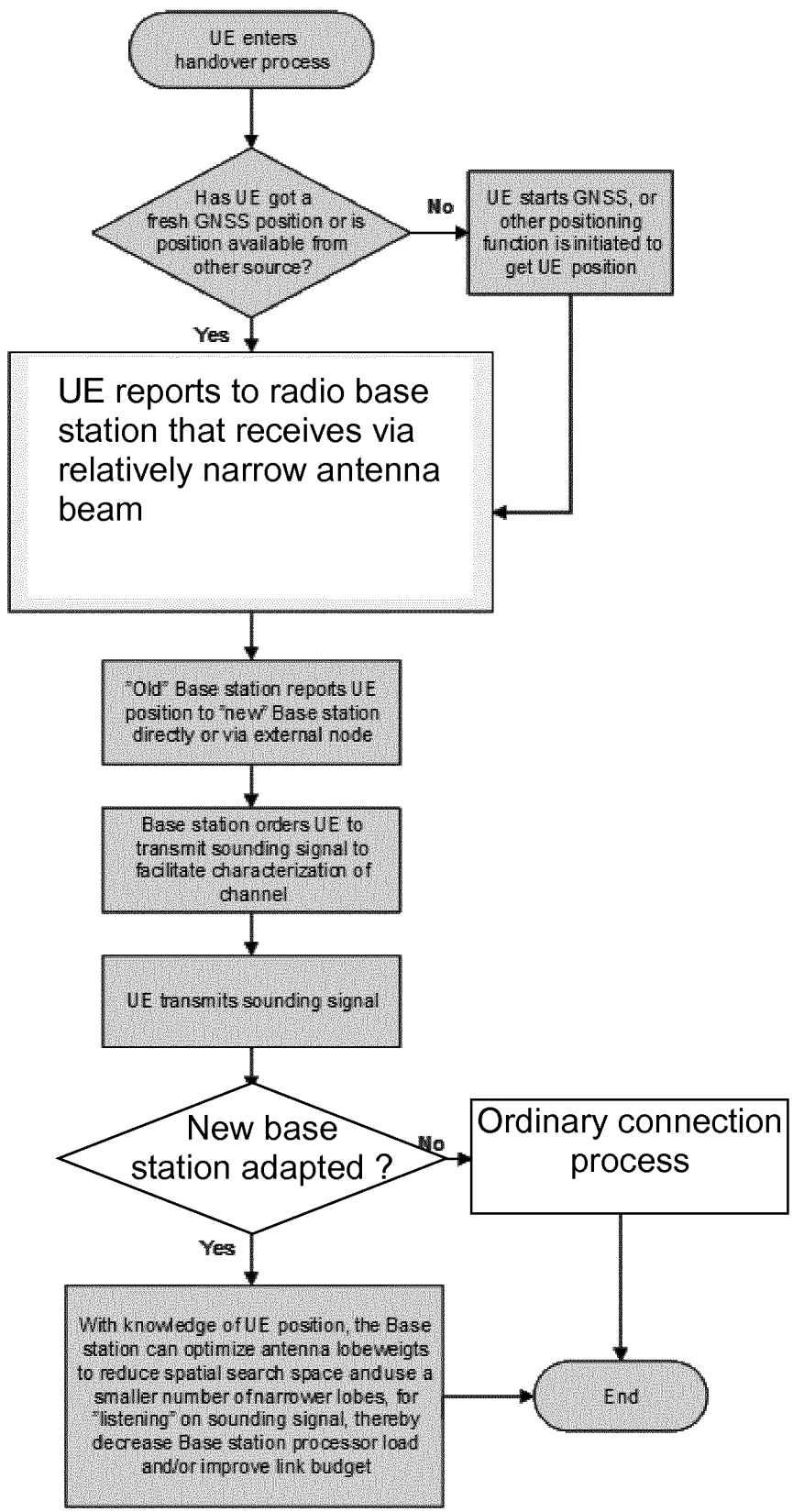
FIG. 8 shows a flowchart of the second example.

An example of the above handover procedure is shown in a flow chart in FIG. 8, where the user terminal 2 is exemplified as a UE (User Equipment).

First, when the process has started and the UE 2 has acquired fresh position data, i.e. information regarding the geographic location of the UE 2, the UE 2 reports this data to the first radio base station 1 that receives via the relatively narrow tracking beam 19. The first radio base station 1 transmits the position data to the third base station 9. The third radio base station 9 then orders the UE 2 to transmit an SRS, which the UE 2 then does.

If the third radio base station 9 is adapted for handling the position data according to the present disclosure, a number of relatively narrow antenna lobes are used for listening for the SRS, and if not, an ordinary connection process will occur instead.

Figure 4:
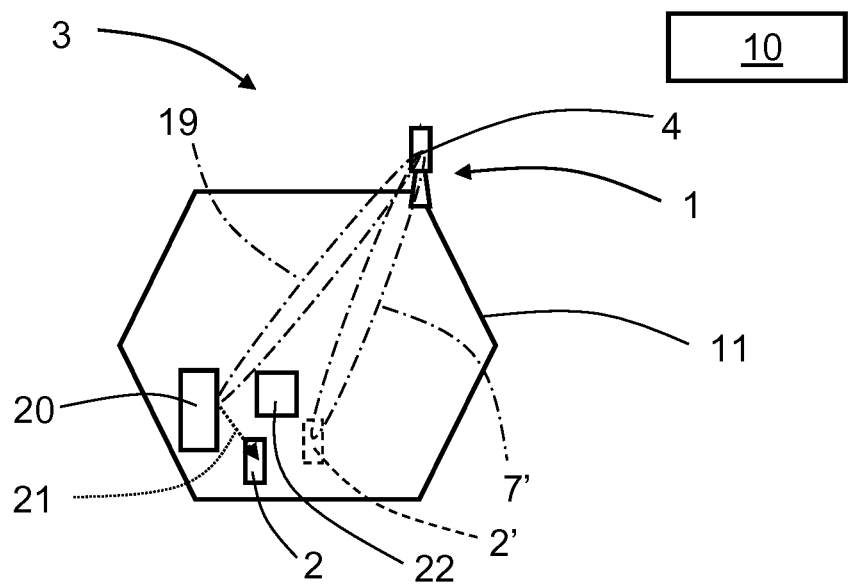
FIG. 4 shows a schematical view of a third example of a wireless communication system.

With reference to FIG. 4, the first radio base station 1 communicates with the user terminal 2 via a tracking beam 19. The tracking beam is reflected in a first building 20 such that contact is established, as indicated with a dotted arrow 21, since the line of sight between the first radio base station 1 and the user terminal 2 is obscured by a second building. The user terminal 2 is moving, and when the user terminal 2' has moved to a position where the communication via the reflection 21 has deteriorated to a certain degree, the user terminal 2' is requested to obtain information related to its geographic location, and to transmit said information to the first radio base station 1. In this case, either the relatively narrow tracking beam 19 or a relatively broad beam is here used for receiving the information regarding the geographic location of the user terminal 2. This depends on the correctness of the tracking of the user terminal 2.

Having this information, the connection procedure described with reference to FIG. 1 and FIG. 2 above is repeated, such that a communication is re-established at the user terminal's new position.

Figure 9:
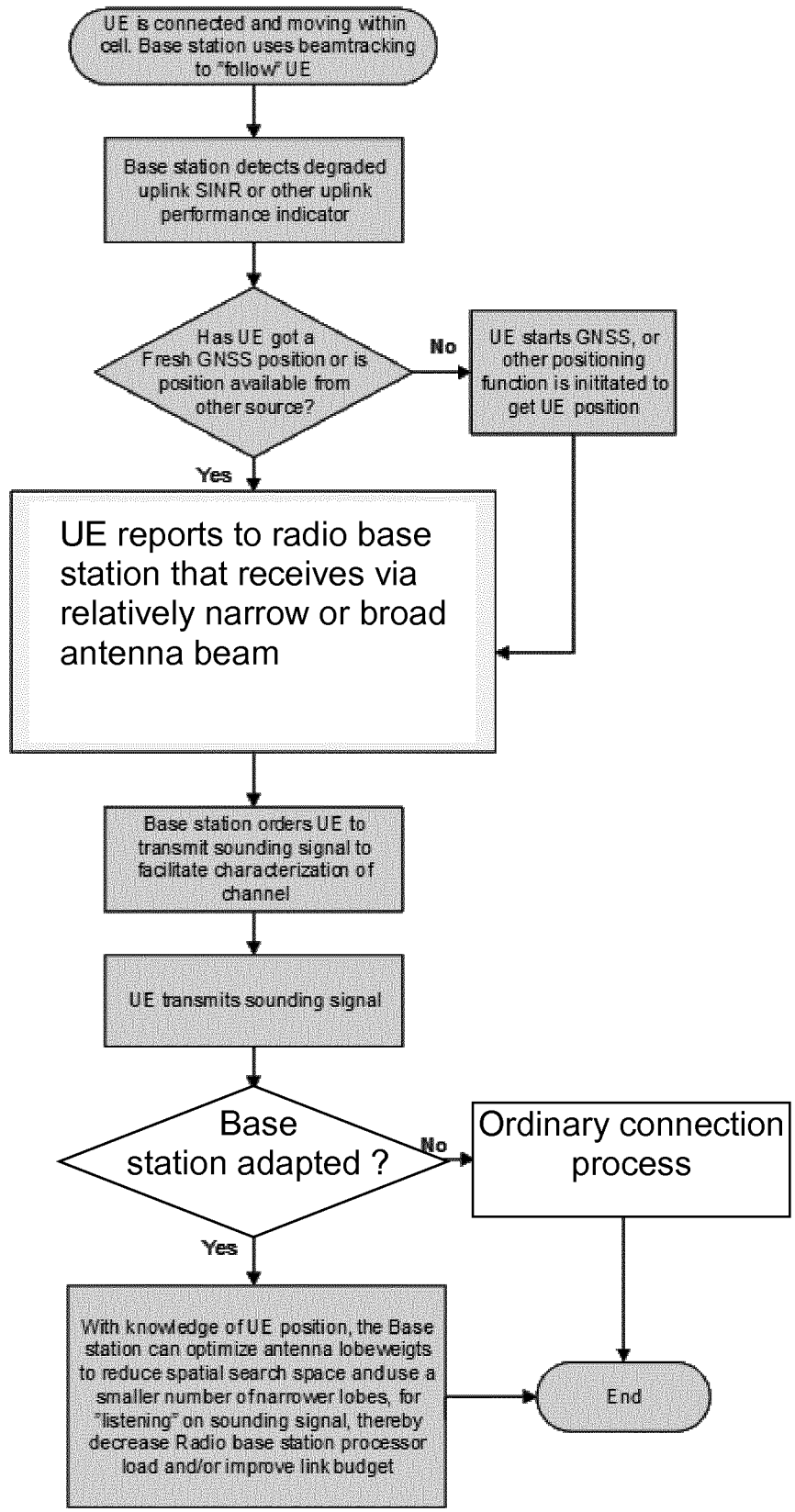
FIG. 9 shows a flowchart of the third example.

An example of the above handover procedure is shown in a flow chart in FIG. 9, where the user terminal 2 is exemplified as a UE (User Equipment).

First, beam-tracking is used for maintaining communication between the first radio base station 1 and the UE until uplink signal properties have deteriorated to a certain degree. When the UE 2 has acquired fresh position data, i.e. information regarding the geographic location of the UE 2, the UE 2 reports this data to the first radio base station 1 that receives via relatively narrow or broad antenna beam.

The first radio base station 1 then orders the UE to transmit an SRS, which the UE then does.

If the first radio base station 1 is adapted for handling the position data according to the present disclosure, a number of relatively narrow antenna lobes are used for listening for the SRS, and if not, an ordinary connection process will occur instead.

A number of examples and situations have been described above, and the following can be summarized for the functionality of the present disclosure. The radio base station in question has to be equipped for interpreting and handling received information related to the geographic location of a user terminal, and to determine an appropriate directive beam configuration of its directive antenna. The beam configuration used for listening for the SRS can comprise one relatively narrow beam, or a plurality of narrow beams. In the examples, there have been three narrow beams, but in practice there may be any suitable number of such beams. According to some aspects, the number of narrow beams depends one at least one of the antenna aperture size and the properties of the corresponding coverage area.

In the examples discussed, the user terminal has been adapted to obtain information regarding its geographic location, but as mentioned initially, according to some aspects, information related to the geographic location of a user terminal can be obtained by means of other nodes in the wireless communication system 3, for example by means of triangulation. In this case, the present disclosure only needs to be implemented in the relevant radio base stations, or in one or more processing nodes 10 comprised in the wireless communication system 3. This means that according to some aspects, the present disclosure can be implemented only in a processing node 10 that is separated from the communicating nodes; the network nodes 1, 9 and the wireless device 2. It is also conceivable that the present disclosure is implemented in a processing node 10 according to the above an the wireless device 2, in the case where the wireless device is adapted to obtain information regarding its geographic location This means that according to some aspects the functionality of establishing communication between the first network node 1 and the wireless device 2 can be realized in many ways and combinations:

Only in the first network node 1.

Only in the wireless device 2.

In both the first network node 1 and the wireless device 2.

Only in the processing node 10.

In the processing node 10 in combination with any other of the alternatives above.

Figure 5:
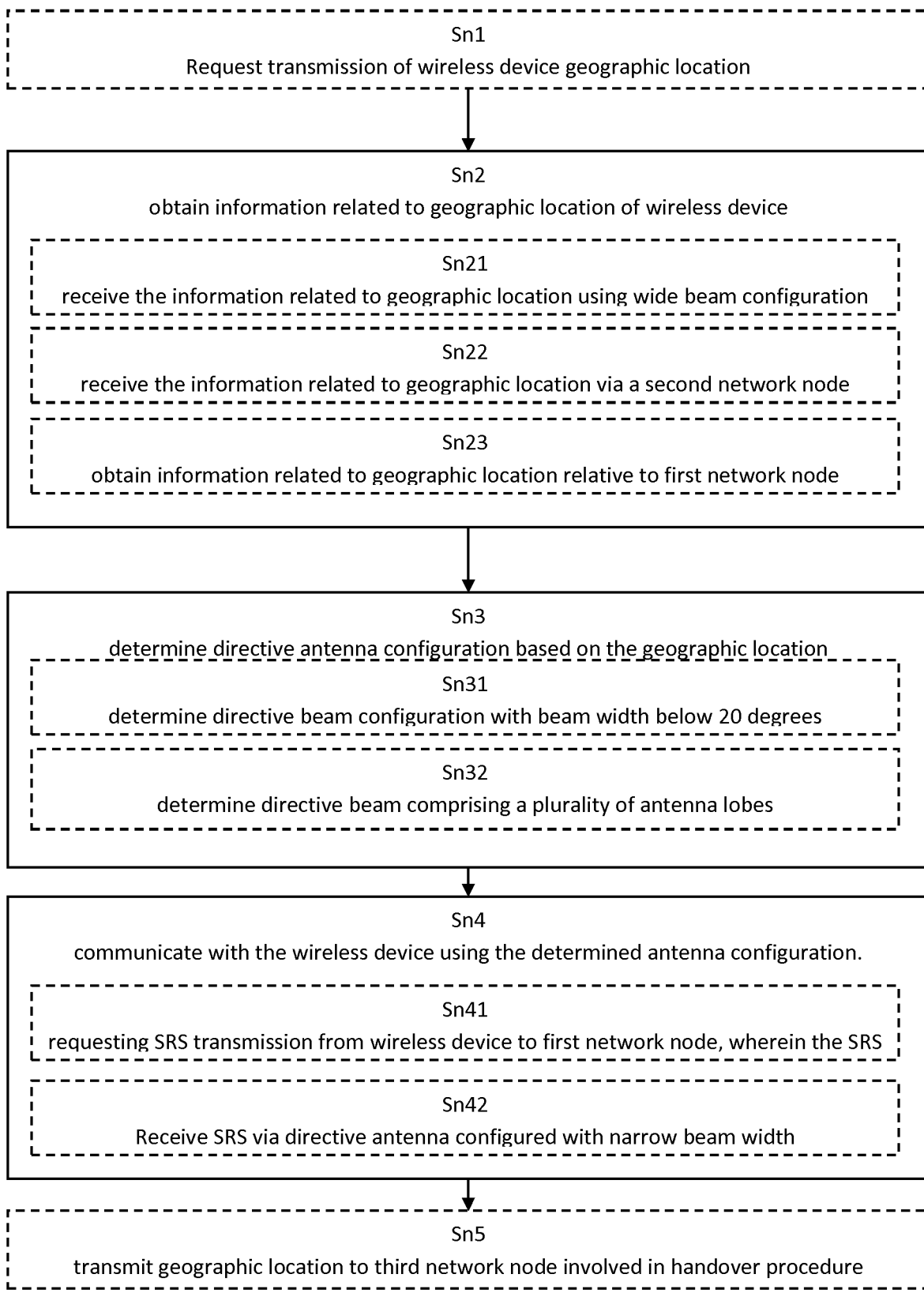
FIG. 5 shows a flowchart of first methods according to the present disclosure.
Figure 6:
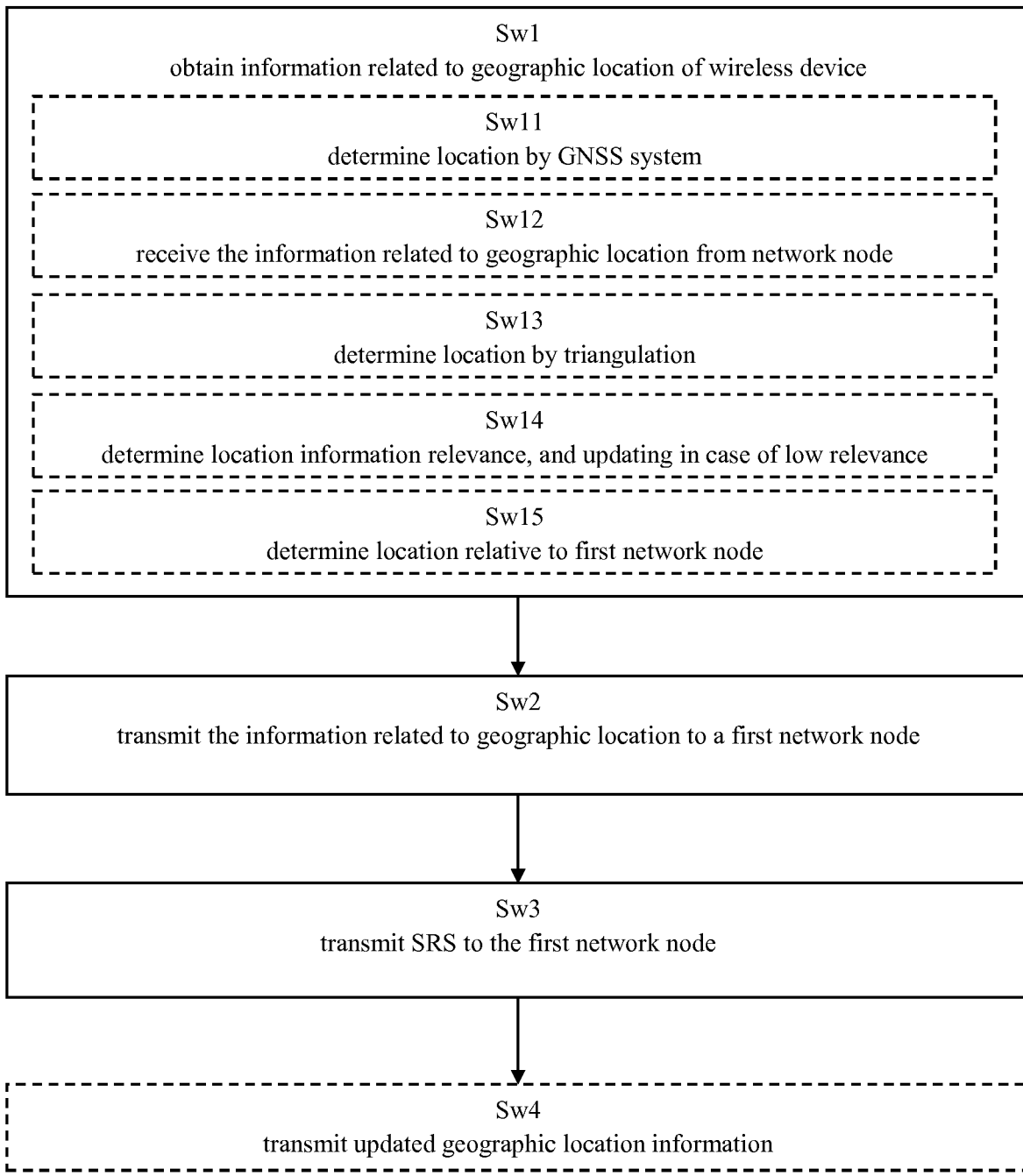
FIG. 6 shows a flowchart of second methods according to the present disclosure.

With reference to FIG. 5, the present disclosure relates to a method for establishing communication between a first network node 1 and a wireless device 2 in a wireless communication system 3, performed by a network node 1. The method comprises;

Sn2: Obtaining information related to a geographic location of the wireless device 2.

Sn3: Determining an antenna configuration of the first network node 1 for communicating with the wireless device 2 via a directive antenna 4, based on the geographic location of the wireless device 2.

Sn4: Communicating with the wireless device 2 by the first network node 1, via the directive antenna 4, using the determined antenna configuration.

According to some aspects, the method further comprises:

Sn1: Requesting the wireless device 2 to transmit the information related to geographic location to the first network node 1.

According to some aspects, the obtaining Sn2 of information comprises:

Sn21: Receiving the information related to said geographic location via a directive beam 5 of the directive antenna 4, wherein the directive beam 5 is arranged to have a beamwidth in excess of 20 degrees.

According to some aspects, the obtaining Sn2 of information comprises:

Sn22: Receiving the information related to geographic location via a second network node 6.

According to some aspects, the obtaining Sn2 of information comprises:

Sn23: Obtaining information related to a geographic location relative to the first network node 1. This is possible since the geographic location of the network node is known, where the network node now has obtained information related to a geographic location of the wireless device 2.

According to some aspects, the determining Sn3 of an antenna configuration comprises:

Sn31: Determining a directive beam configuration of the directive antenna 4 arranged to have a beamwidth below 20 degrees.

According to some aspects, the determining Sn3 of an antenna configuration comprises:

Sn32: Determining a directive beam configuration of the directive antenna 4, wherein the directive beam comprises a plurality of antenna lobes 7a, 7b, 7c.

According to some aspects, the communicating Sn4 with the wireless device 2 comprises:

Sn41: Requesting the wireless device 2 to transmit a Sounding Reference Signal (SRS) to the first network node 1.

According to some aspects, the communicating Sn4 with the wireless device 2 comprises:

S42: Receiving the SRS via a directive beam 7 of the directive antenna 4 configured to have a beamwidth exceeding 20 degrees.

According to some aspects, the method further comprises:

Sn5: Transmitting the information related to geographic location to a third network node 9 involved in a handover procedure comprising the wireless device 1.

According to some aspects, the first network node 1 is a radio base station.

According to some aspects, the network node arranged to perform the method is the first network node 1.

According to some aspects, the network node arranged to perform the method is a processing node 10, different from the first network node 1, comprised in the wireless communication system 3.

With reference to FIG. 5, the present disclosure relates to a method for establishing communication between a first network node 1 and a wireless device 2 in a wireless communication system 3, performed by the wireless device 2. The method comprises:

Sw1: Obtaining information related to a geographic location of the wireless device 2.

Sw2: Transmitting the information related to the geographic location to the first network node 1.

Sw3: Transmitting a Sounding Reference Signal, SRS, to the first network node 1.

According to some aspects, the obtaining Sw1 of information comprises:

SW11: Determining the geographic location by a Global Navigation Satellite System (GNSS).

According to some aspects, the obtaining Sw1 of information comprises:

Sw12: Receiving geographic location information related to the wireless device 2 from a network node 1, 9 comprised in the wireless communication system 3.

According to some aspects, the obtaining Sw1 of information comprises:

Sw13: Determining the geographic location by triangulation in the wireless communication system 3.

According to some aspects, the obtaining Sw1 of information comprises:

Sw14: Determining a relevance of a previously stored geographic location, and updating the geographic location in case the determined relevance does not satisfy a relevance criterion.

According to some aspects, the obtaining Sw1 of information comprises:

Sw15: determining a geographic location relative to the first network node 1.

According to some aspects, the information related to geographic location comprises a message indicating support by the wireless device 2 for transmitting information related to geographic location to the first network node 1.

According to some aspects, the method comprises:

Sw4: Transmitting, in response to receiving a request for transmission of updated geographic location information, updated geographic location to the first network node 1.

Figure 10:
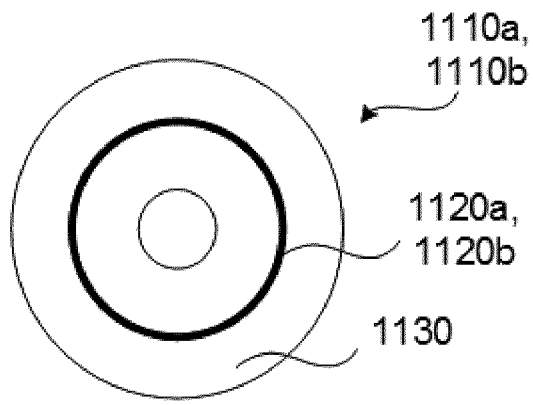
FIG. 10 shows a schematical view of a computer program product.
Figure 11:
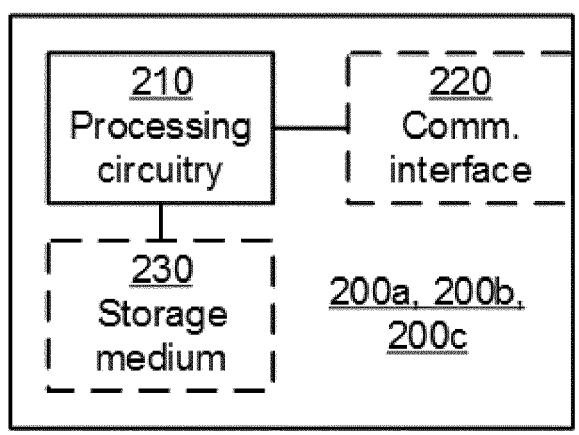
FIG. 11 shows a schematical view of examples of nodes.

With reference to FIG. 10 and FIG. 11, the present disclosure also relates to a computer program 1120a for establishing communication between a first network node 1 and a wireless device 1 in a wireless communication system 3. The computer program comprises computer code which, when run on processing circuitry 210 of a network node 200a, causes the network node to:

obtain information related to a geographic location of the wireless device 2;

determine an antenna configuration of the first network node 1 for communicating with the wireless device 2 via the directive antenna 4, based on the geographic location of the wireless device 2; and to communicate with the wireless device 2 by the first network node 1, via the directive antenna 4, by means of the determined antenna configuration.

The present disclosure also relates to a computer program 1120b for establishing communication between a first network node 1 and a wireless device 2 in a wireless communication system 3. The computer program 1120b comprises computer code which, when run on processing circuitry 210 of a wireless device 200b, causes the wireless device to:

obtain information related to a geographic location of the wireless device 2;

transmit the information related to the geographic location to the first network node 1; and to transmit a Sounding Reference Signal (SRS) to the first network node 1.

The present disclosure also relates to a computer program product 1110a, 1110b comprising a computer program 1120a, 1120b according to the above, and a computer readable storage medium 1130 on which the computer program is stored.

The present disclosure is not limited to the examples above, but may vary freely within the scope of the appended claims. For example, the node 1 may comprise one or more antenna arrangements, each antenna arrangement having a certain coverage, which does not have to lie in an azimuth plane, by may lie in any suitable plane, such as for example an elevation plane.

The antenna devices and their corresponding antenna beams can be single or dual polarized.

This present disclosure addresses a wireless communication system where the communication channel properties Channel State Information (CSI) are estimated by means of a sounding reference signal which means a reference signal transmitted by a user terminal such as a UE and received by a base station or similar, usually, but not necessarily referred to as SRS.

According to some aspects, with reference to FIG. 12, there is a wireless communication system 1 where a network node 1, 10 is adapted to establish communication between a first network node 1 and a wireless device 2, where the wireless communication system 1 comprises:
- a first obtaining module Xn2 that is that is configured to obtain information related to a geographic location of the wireless device 2;
- a first determining module Xn3 that is configured to determine an antenna configuration of the first network node 1 for communicating with the wireless device 2 via a directive antenna 4, based on the geographic location of the wireless device 2; and
- a communicating module Xn4 that is configured to communicate with the wireless device 2 by the first network node 1, via the directive antenna 4, using the determined antenna configuration.

According to some aspects, the wireless communication system 1 further comprises:
- a first requesting module Xn1 that is configured to request the wireless device 2 to transmit the information related to geographic location to the first network node 1.

According to some aspects, the first obtaining module Xn2 comprises:
- a first receiving module Xn21 that is configured to receive the information related to said geographic location via a directive beam 5 of the directive antenna 4, wherein the directive beam 5 is arranged to have a beamwidth in excess of 20 degrees.

According to some aspects, the first obtaining module Xn2 comprises:
- a second receiving module Xn22 that is configured to receive the information related to geographic location via a second network node 6.

According to some aspects, the first obtaining module Xn2 comprises:
- a second obtaining module Xn23 that is configured to obtain information related to a geographic location relative to the first network node 1.

According to some aspects, the first determining module Xn3 comprises:
- a second determining module Xn31 that is configured to determine a directive beam configuration of the directive antenna 4 arranged to have a beamwidth below 20 degrees.

According to some aspects, the first determining module Xn3 comprises:
- a third determining module Xn32 that is configured to determine a directive beam configuration of the directive antenna 4, wherein the directive beam comprises a plurality of antenna lobes 7a, 7b, 7c.

According to some aspects, the communicating module Xn4 comprises:
- a second requesting module Xn41 that is configured to request the wireless device 2 to transmit a Sounding Reference Signal, SRS, to the first network node 1.

According to some aspects, the communicating module Xn4 comprises:
- a third receiving module X42 that is configured to receive the SRS via a directive beam 7 of the directive antenna 4 configured to have a beamwidth below 20 degrees.

According to some aspects, the wireless communication system 1 further comprises:
- a transmitting module Xn5 that is configured to transmit the information related to geographic location to a third network node 9 involved in a handover procedure comprising the wireless device 1.

According to some aspects, with reference to FIG. 13, there is a wireless communication system 1 where a wireless device 2 is adapted to establish communication between a first network node 1 and the wireless device 2, where the wireless communication system 1 comprises:
- an obtaining module Xw1 that is configured to obtain information related to a geographic location of the wireless device 2;
- a first transmitting module Xw2 that is configured to transmit the information related to the geographic location to the first network node 1; and
- a second transmitting module Xw3 that is configured to transmit a Sounding Reference Signal, SRS, to the first network node 1.

According to some aspects, the obtaining module Xw1 comprises:
- a first determining module Xw11 that is configured to determine the geographic location by a Global Navigation Satellite System, GNSS.

According to some aspects, the obtaining module Xw1 comprises:
- a receiving module Xw12 that is configured to receive a geographic location information related to the wireless device 2 from a network node 1, 9 comprised in the wireless communication system 3.

According to some aspects, the obtaining module Xw1 comprises:
- a second determining module Xw13 that is configured to determine the geographic location by triangulation in the wireless communication system 3.

According to some aspects, the obtaining module Xw1 comprises:
- a third determining module Xw14 that is configured to determine a relevance of a previously stored geographic location, and updating the geographic location in case the determined relevance does not satisfy a relevance criterion.

According to some aspects, the obtaining module Xw1 comprises:
- a forth determining module Xw14 that is configured to determine a geographic location relative to the first network node 1.

Generally, the present disclosure relates to a method for establishing communication between a first network node 1 and a wireless device 2 in a wireless communication system 3, performed by a network node 1, 10, the method comprising;
- Sn2: obtaining information related to a geographic location of the wireless device 2;
- Sn3: determining an antenna configuration of the first network node 1 for communicating with the wireless device 2 via a directive antenna 4, based on the geographic location of the wireless device 2; and
- Sn4: communicating with the wireless device 2 by the first network node 1, via the directive antenna 4, using the determined antenna configuration.

According to some aspects, the method comprises:
- Sn1: requesting the wireless device 2 to transmit the information related to geographic location to the first network node 1.

According to some aspects, the obtaining Sn2 of information comprises:
- Sn21: receiving the information related to said geographic location via a directive beam 5 of the directive antenna 4, wherein the directive beam 5 is arranged to have a beamwidth in excess of 20 degrees.

According to some aspects, the obtaining Sn2 of information comprises:
Sn22: receiving the information related to geographic location via a second network node 6.

According to some aspects, the obtaining Sn2 of information comprises:
Sn23: obtaining information related to a geographic location relative to the first network node 1.

According to some aspects, the determining Sn3 of an antenna configuration comprises:
Sn31: determining a directive beam configuration of the directive antenna 4 arranged to have a beamwidth below 20 degrees.

According to some aspects, the determining Sn3 of an antenna configuration comprises:
Sn32: determining a directive beam configuration of the directive antenna 4, wherein the directive beam comprises a plurality of antenna lobes 7a, 7b, 7c.

According to some aspects, the communicating Sn4 with the wireless device 2 comprises:
Sn41: requesting the wireless device 2 to transmit a Sounding Reference Signal, SRS, to the first network node 1.

According to some aspects, the communicating Sn4 with the wireless device 2 comprises:
S42: receiving the SRS via a directive beam 7 of the directive antenna 4 configured to have a beamwidth below 20 degrees.

According to some aspects, the method comprises:
Sn5: transmitting the information related to geographic location to a third network node 9 involved in a handover procedure comprising the wireless device 1.

According to some aspects, the first network node 1 is a radio base station.

According to some aspects, the network node arranged to perform the method is the first network node 1.

According to some aspects, the network node arranged to perform the method is a processing node 10, different from the first network node 1, comprised in the wireless communication system 3.

Generally, the present disclosure also relates to a method for establishing communication between a first network node 1 and a wireless device 2 in a wireless communication system 3, performed by the wireless device 2, the method comprising;
Sw1: obtaining information related to a geographic location of the wireless device 2;
Sw2: transmitting the information related to the geographic location to the first network node 1; and
Sw3: transmitting a Sounding Reference Signal, SRS, to the first network node 1.

According to some aspects, the obtaining Sw1 of information comprises:
Sw11: determining the geographic location by a Global Navigation Satellite System, GNSS.

According to some aspects, the obtaining Sw1 of information comprises:
Sw12: receiving geographic location information related to the wireless device 2 from a network node 1, 9 comprised in the wireless communication system 3.

According to some aspects, the obtaining Sw1 of information comprises:
Sw13: determining the geographic location by triangulation in the wireless communication system 3.

According to some aspects, the obtaining Sw1 of information comprises:
Sw14: determining a relevance of a previously stored geographic location, and updating the geographic location in case the determined relevance does not satisfy a relevance criterion.

According to some aspects, the obtaining Sw1 of information comprises:
Sw15: determining a geographic location relative to the first network node 1.

Generally, the present disclosure also relates to a network node 1, 10 adapted to establish communication between a first network node 1 and a wireless device 2 in a wireless communication system 3, where the first network node 1 comprises a directive antenna 4, where the network node 1, 10 is adapted to:
obtain information related to a geographic location of the wireless device 2;
determine an antenna configuration of the first network node 1 for communicating with the wireless device 2 via the directive antenna 4, based on the geographic location of the wireless device 2; and to
communicate with the wireless device 2 by the first network node 1, via the directive antenna 4, by means of the determined antenna configuration.

According to some aspects, the network node 1, 10 is adapted to request the wireless device 2 to transmit the information related to geographic location to the first network node 1.

According to some aspects, the network node 1, 10 is adapted to receive the information related to said geographic location via a directive beam 5 of the directive antenna 4, wherein the directive beam 5 is arranged to have a beamwidth in excess of 20 degrees.

According to some aspects, the network node 1, 10 is adapted to receive the information related to geographic location via a second network node 6.

According to some aspects, the network node 1, 10 is adapted to obtain information related to a geographic location relative to the first network node 1.

According to some aspects, the network node 1, 10 is adapted to determine a directive beam configuration of the directive antenna 4 arranged to have a beamwidth below 20 degrees.

According to some aspects, the network node 1, 10 is adapted to determine a directive beam configuration of the directive antenna 4, wherein the directive beam comprises a plurality of antenna lobes 7a, 7b, 7c.

According to some aspects, the network node 1, 10 is adapted to request the wireless device 2 to transmit a Sounding Reference Signal, SRS, to the first network node 1.

According to some aspects, the network node 1, 10 is adapted to receive the SRS via a directive beam 7 of the directive antenna 4 configured to have a beamwidth below 20 degrees.

According to some aspects, the network node 1, 10 is adapted to transmit the information related to geographic location to a third network node 9 involved in a handover procedure comprising the wireless device 1.

According to some aspects, the first network node 1 is a radio base station.

According to some aspects, the network node 1 that is adapted to establish communication between the first network node 1 and the wireless device 2 is the first network node 1.

According to some aspects, the network node 10 that is adapted to establish communication between the first network node 1 and the wireless device 2 is a processing node 10, different from the first network node 1, comprised in the wireless communication system 3.

Generally, the present disclosure also relates to a wireless device 2 adapted to establish communication between a first network node 1 and the wireless device 2 in a wireless communication system 3, where the wireless device 2 is adapted to:

obtain information related to a geographic location of the wireless device 2;

transmit the information related to the geographic location to the first network node 1; and to transmit a Sounding Reference Signal, SRS, to the first network node 1.

According to some aspects, the wireless device 2 is adapted to determine the geographic location by a Global Navigation Satellite System, GNSS.

According to some aspects, the wireless device 2 is adapted to receive geographic location information related to the wireless device 2 from a network node 1, 9 comprised in the wireless communication system 3.

According to some aspects, the wireless device 2 is adapted to determining the geographic location by triangulation in the wireless communication system 3.

According to some aspects, the wireless device 2 is adapted to determine a relevance of a previously stored geographic location, and updating the geographic location in case the determined relevance does not satisfy a relevance criterion.

According to some aspects, the wireless device 2 is adapted to determining a geographic location relative to the first network node 1.

Generally, the present disclosure also relates to a wireless communication system 3 comprising a first network node 1 and a wireless device 2, where the wireless communication system 3 is adapted to establish communication between the first network node 1 and the wireless device 2, where the first network node 1 comprises a directive antenna 4, where the wireless device 2 is adapted to:

obtain information related to a geographic location of the wireless device 2;

transmit the information related to the geographic location to the first network node 1; and to transmit a Sounding Reference Signal, SRS, to the first network node 1; and where the network node 1, 10 is adapted to:

receive information related to a geographic location of the wireless device 2;

determine an antenna configuration of the first network node 1 for communicating with the wireless device 2 via the directive antenna 4, based on the geographic location of the wireless device 2; and to communicate with the wireless device 2 by the first network node 1, via the directive antenna 4, by means of the determined antenna configuration.

The invention claimed is:

1. A method for establishing communication between a first network node and a wireless device in a wireless communication system, the method comprising:

the first network node receiving information related to a geographic location of the wireless device using a first beam that is wider than any beam included in a group of one or more beams, wherein the information related to the geographic location of the wireless device was transmitted by the wireless device;

based on the geographic location of the wireless device, the first network node determining an antenna configuration of the first network node for communicating with the wireless device via a directive antenna, wherein determining the antenna configuration of the first network node comprises selecting from a plurality of beams the group of one or more beams to use for receiving a sounding reference signal transmitted by the wireless device; and using the determined antenna configuration, the first network node communicating with the wireless device via the directive antenna, wherein communicating with the wireless device comprises receiving the sounding reference signal transmitted by the wireless device using the group of one or more beams.

2. The method according to claim 1, comprising:

the first network node requesting the wireless device to transmit the information related to the geographic location to the first network node.

3. The method according to claim 1, wherein the first beam is arranged to have a beamwidth in excess of 20 degrees.

4. The method according to claim 1, wherein receiving the information related to the geographic location of the wireless device comprises:

receiving information related to the geographic location relative to the first network node.

5. The method according to claim 1, wherein determining the antenna configuration comprises:

determining a directive beam configuration of the directive antenna arranged to have a beamwidth below 20 degrees.

6. The method according to claim 1, wherein determining the antenna configuration comprises determining a directive beam configuration of the directive antenna, and the directive beam comprises a plurality of antenna lobes.

7. The method according to claim 1, wherein communicating with the wireless device comprises:

requesting the wireless device to transmit the sounding reference signal to the first network node.

8. The method according to claim 7, wherein each beam included in the group of one or more beams has a beamwidth below 20 degrees.

9. The method according to claim 1, comprising:

transmitting the information related to the geographic location of the wireless device to a third network node involved in a handover procedure.

10. The method according to claim 1, wherein the first network node is a radio base station.

11. A first network node adapted to establish communication between the first network node and a wireless device in a wireless communication system, wherein the first network node comprises a directive antenna, the first network node being adapted to:

receive information related to a geographic location of the wireless device using a first beam that is wider than any beam included in a group of one or more beams, wherein the information related to the geographic location of the wireless device was transmitted by the wireless device;

based on the geographic location of the wireless device, determine an antenna configuration of the first network node for communicating with the wireless device via the directive antenna, wherein determining the antenna configuration of the first network node comprises selecting from a plurality of beams the group of one or more beams to use for receiving a sounding reference signal transmitted by the wireless device; and using the determined antenna configuration, communicate with the wireless device via the directive antenna, wherein communicating with the wireless device comprises receiving the sounding reference signal transmitted by the wireless device using the group of one or more beams.

12. The first network node according to claim 11, wherein the first network node is adapted to request the wireless device to transmit the information related to the geographic location to the first network node.

13. The first network node according to claim 11, wherein the first beam is arranged to have a beamwidth in excess of 20 degrees.

14. The first network node according to claim 11, wherein the first network node is adapted to receive information related to the geographic location relative to the first network node.

15. The first network node according to claim 11, wherein the first network node is adapted to determine a directive beam configuration of the directive antenna arranged to have a beamwidth below 20 degrees.

16. The first network node according to claim 11, wherein the first network node is adapted to determine a directive beam configuration of the directive antenna, and the directive beam comprises a plurality of antenna lobes.

17. The first network node according to claim 11, wherein the first network node is adapted to request the wireless device to transmit the sounding reference signal to the first network node.

18. The first network node according to claim 17, wherein each beam included in the group of one or more beams has a beamwidth below 20 degrees.

19. The first network node according to claim 11, wherein the first network node is adapted to transmit the information related to the geographic location to a third network node involved in a handover procedure.

20. The first network node according to claim 11, wherein the first network node is a radio base station.

21. The method according to claim 1, wherein
the group of one or more beams includes more than one beam, and
the group of one or more beams is used for a reduced spatial beam search.

22. The network node according to claim 11, wherein
the group of one or more beams includes more than one beam, and
the group of one or more beams is used for a reduced spatial beam search.

* * * * *